(No Model.) 3 Sheets—Sheet 1.
C. C. HUNTER.
COMBINED GARDEN CULTIVATOR AND SEED DRILL.
No. 356,129. Patented Jan. 18, 1887.
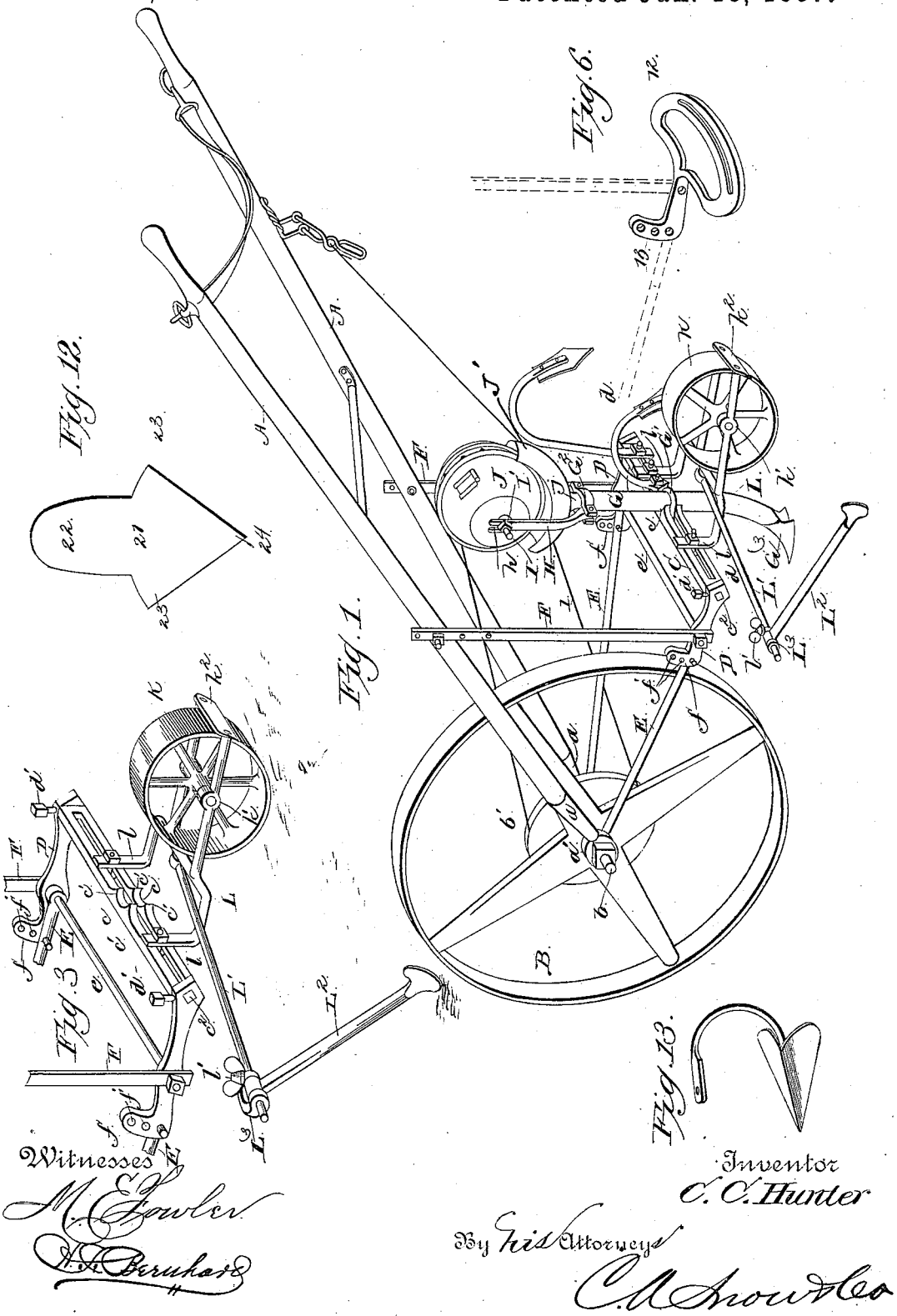
Witnesses
Inventor
C. C. Hunter
By his Attorneys (No Model.) 3 Sheets—Sheet 2.
C. C. HUNTER.
COMBINED GARDEN CULTIVATOR AND SEED DRILL.
No. 356,129. Patented Jan. 18, 1887.
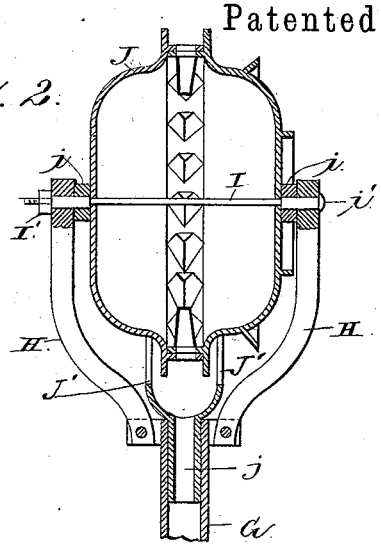
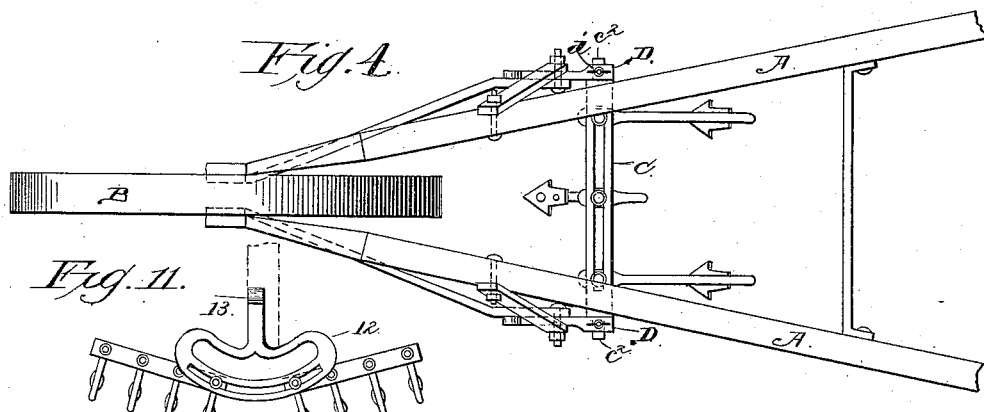
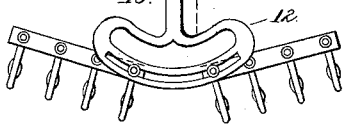
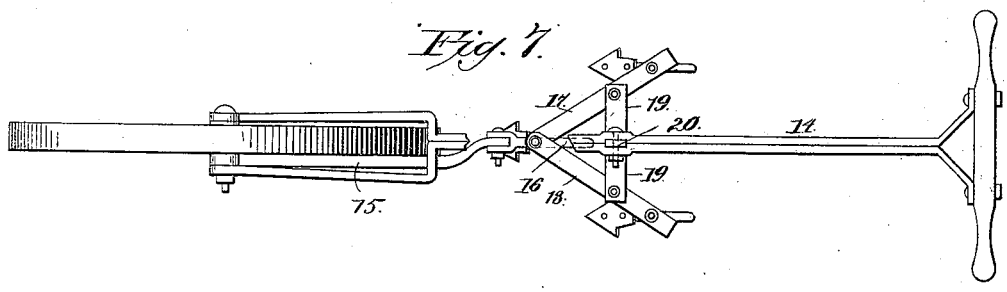
Witnesses
M. E. Fowler
A. F. Bernhard
Inventor
C. C. Hunter
By his Attorneys
C. A. Snow & Co.

(No Model.) 3 Sheets—Sheet 3.
C. C. HUNTER.
COMBINED GARDEN CULTIVATOR AND SEED DRILL.
No. 356,129. Patented Jan. 18, 1887.
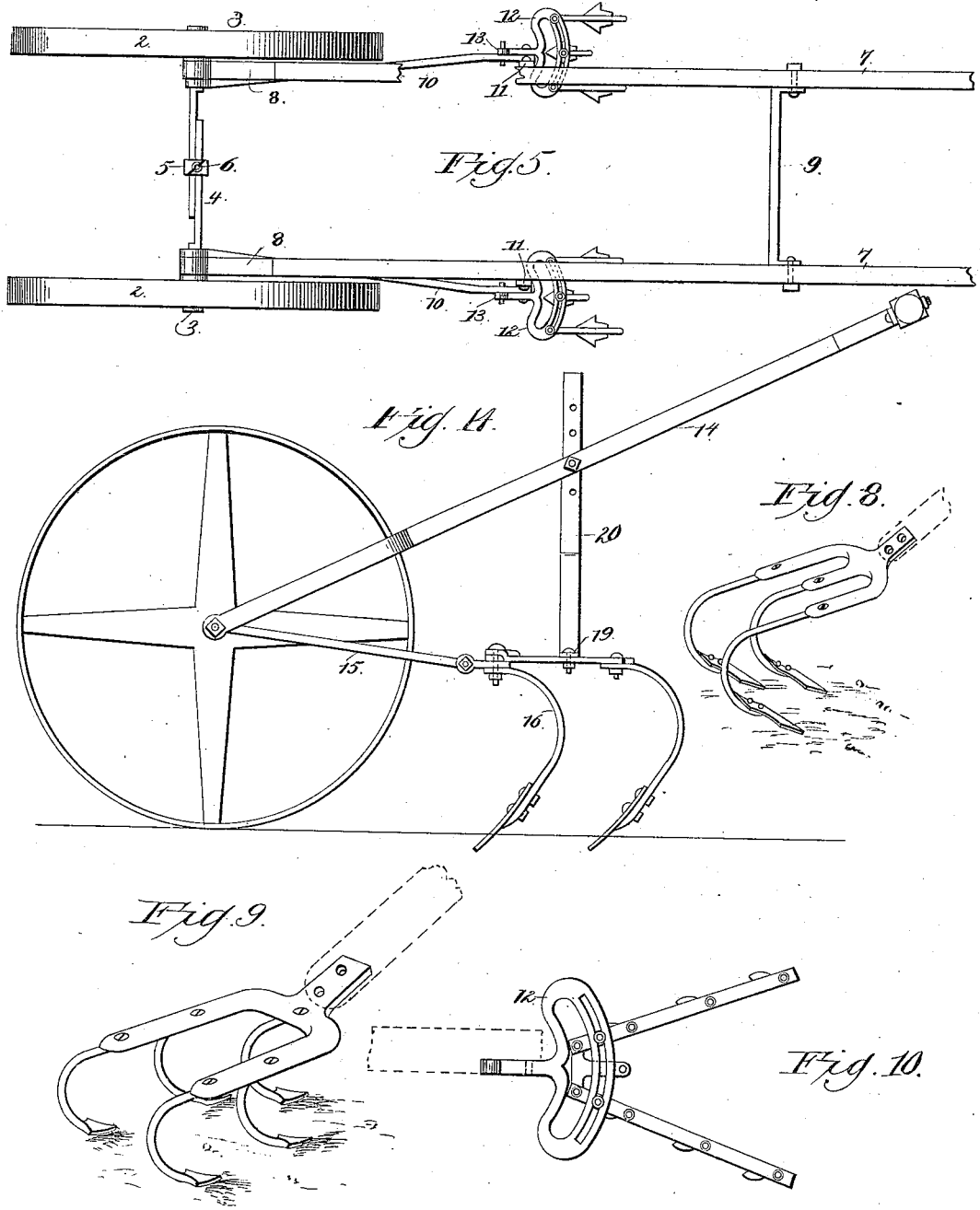

UNITED STATES PATENT OFFICE.

CHRISTOPHER C. HUNTER, OF CONCORDIA, KANSAS.

COMBINED GARDEN-CULTIVATOR AND SEED-DRILL.

SPECIFICATION forming part of Letters Patent No. 356,129, dated January 18, 1887.

Application filed March 26, 1886. Serial No. 196,707. (No model.)

*To all whom it may concern:*

Be it known that I, CHRISTOPHER C. HUNTER, a citizen of the United States, residing at Concordia, in the county of Cloud and State of Kansas, have invented a new and useful Improvement in Combined Garden-Cultivators and Seed-Drills, of which the following is a specification, reference being had to the accompanying drawings.

My invention relates to improvements in combined garden-cultivators and seed-drills; and it consists of the peculiar and novel construction and combination of parts, substantially as hereinafter fully set forth, and specifically pointed out in the claims.

The present invention is especially designed as an improvement on the cultivator patented to me on the 8th day of December, 1885, by Letters Patent No. 331,885; and it has for its object to provide an improved form of slotted beam to which the cultivating implements are attached; to provide means for adjustably connecting the slotted beam to the driving-wheel; to provide an adjustable marker, and to improve the machine shown in the patent hereinbefore referred to in minor details of construction.

In the accompanying drawings, Figure 1 is a perspective view of my improved machine, showing the device adjusted for use as a seed-drill. Fig. 2 is an enlarged sectional view through the seed drum and tube. Fig. 3 is an enlarged view, in perspective, of the slotted beam, the roller-frame, the marker, and means for adjusting the inclination of the slotted beam. Fig. 4 is a view of the frame adjusted for use as a cultivator. Fig. 5 is a plan view of another form of my invention, showing two carrying-wheels and the cultivators attached thereto. Fig. 6 is a detail view of a slotted bar or bow for attaching the cultivator or garden-tools. Fig. 7 is a plan view showing the device adjusted for a single cultivator with a single bearing-wheel and handle. Fig. 8 is a detail view of a three-blade garden tool or implement. Figs. 9, 10, 11, 12, and 13 are views in detail of different forms of implements or tools. Fig. 14 is a side elevation of the device shown in Fig. 7.

Referring to the drawings, in which like letters of reference denote corresponding parts in all the figures, A designates the handles of my improved machine, which are provided at one end with metallic ferrules $a$, that have enlarged perforated heads $a'$, and these heads bear against opposite side faces of the hub of the carrying-wheel B, which is journaled on a shaft, $b$, that passes through the hub and heads $a'$ and is suitably secured in place by nuts, said wheel having a band-pulley, $b'$, thereon that drives a belt which rotates the seed-drum, as will be presently described.

C designates a slotted beam to which the garden tools or implements are attached. This beam is provided on one of its side faces with curved seats $c$ for the reception of the lower end of the hoe or tube of the seed-drill, and these seats $c$ are formed by integral lugs $c'$, that are curved and join each other, the curvature of the seats $c$ corresponding to that of the drill tube or hoe, which is thus very securely and firmly retained in place, and the ends of the slotted beam are provided with square or angular lugs or studs $c^2$, which are fitted in corresponding openings in the enlarged ends or lugs $d$ of bars or arms D, and are securely held or clamped in place by binding-screws $d'$, carried by said bars D. These arms or bars are supported and braced by arms E F, which are connected at one end to the bars at points intermediate of their ends by a single through bolt or rod, $e$, the other or free ends of the arms E being connected to the shaft of the driving or carrying wheel B, and the free ends of the arms F are perforated and adjustably bolted to the handles A, to vary the elevation of the slotted beam from the ground.

The free ends of the bars or arms D are each provided with an enlargement or lug, $f$, that projects upwardly therefrom, and is provided with two or more apertures, $f'$, and the arms E are provided with transverse apertures that coincide with one of the openings of each of the enlargements, a bolt or pin being passed through the aligned openings of the enlargement and brace-arm E. The angle or inclination of the slotted beam can be varied by adjusting the pin or bolt into the corresponding apertures, and adjusting the brace-arms E accordingly, whereby the garden tools or implements carried by the slotted beam will be presented at various or diverse angles to the ground, and the rod or bolt $c$ passes through the arms D, E, and F at the point where they are connected together and receive tightening-nuts, whereby the parts are detachably and rigidly secured together and braced against lateral or longitudinal play. By means of the angular studs of the slotted beam and the binding-screws of the bars or arms D the beam can be easily removed, so that it can be conveniently adjusted to adapt the device to the drill tube or hoe G, or the cultivator or garden-tools.

The drill hoe or tube G bears against or fits within the seat $c$, and is detachably clamped to the beam by means of a strap, G', the arms of which pass through the slot of the beam and receive binding-nuts.

$G^2$ designates a clamp, which is secured to the upper end of the drill or hoe, and this clamp carries the bracket arms or standards H. The free ends of these standards are slotted, as at $h$, and receive the rod or shaft I, that supports the seed drum or cylinder J in place. This cylinder is made in two sections, which are curved, as shown, in cross-section and provided with flanged rims that lap one another and are perforated, the perforations being in coincidence to permit of the passage of the seed, and the rims are adapted to be turned slightly, so as to vary the size of the openings. The shaft I extends longitudinally through the drum, to connect the sections together, and between the drum and standards are interposed washers $i$, to prevent wear and friction. One end of the shaft has an enlarged end, to form a head to receive a washer, $i'$, that bears against the outer face of the standard, while the other end of the shaft is reduced and threaded, and receives a binding or thumb screw, I', to securely hold the several parts together. The seed-drum is partially surrounded by a shield, J', as shown more clearly in Figs. 1 and 2 of the drawings, that is curved transversely and receives the seed from the drum as it is discharged through the openings and conducts the same by a tube, $j$, to the drill or hoe G, which has an opening-blade, $G^3$, at its lower end.

K designates a covering-roller that is mounted on a suitable shaft journaled in proper bearings in parallel bars $k'$, the rear ends of which carry a clearing-blade, $k^2$, that serves to bear against the periphery of the roller to prevent accumulation thereon of earth, and the front ends of the bars are secured in or to a frame, L, that is provided with bent ends $l$, which are perforated and adjustably secured at any desired angle to the slotted beam by means of bolts and nuts.

L' designates a marker arm or rod, which is bolted at one end to the frame and rests on one of the cross-bars thereof, so that it is carried by the frame, and to the free end of this arm or rod is loosely connected the marker $L^2$, so that it is free to move or oscillate thereon, and be adjusted longitudinally to accommodate different classes of work, the longitudinal adjustment on the rod or arm of the marker being confined or limited by a yoke, $L^3$, that straddles the head of the marker, and has openings or rings at its ends that bear against opposite faces of the head, one of the rings or bands carrying a binding-screw, $l'$, so that it is rigidly held on the marker-arm.

The seed-drum is provided with a suitable band-pulley, over which passes a band, 1, that communicates motion to the drum from the band-wheel $b'$, over which it also passes.

The operation of the seed-drill will be readily understood from the foregoing description, taken in connection with the drawings, and the seed-drill can be easily and readily removed, the slotted beam reversed, and the cultivator or other agricultural or garden tools connected thereto. When the device is adjusted for use as a cultivator, the shanks of the blades are fitted against the under side of the beam and bolted thereto. The teeth or blades may be arranged in zigzag rows or parallel with each other, and the frames that carry the blades or teeth may be adjustably secured to the beam and independently of each other. The brace-arms D, E, and F are also employed to support and strengthen the beam, and the latter can be adjusted either vertically or at an angle to the ground to properly present the cultivator blades or tools to the ground.

In Fig. 5 of the drawings I show another form of my invention, in which I employ two carrying-wheels, 2, that are journaled on short axles 3 of the adjustable frame-sections 4, which are fitted into a common sleeve, 5, of the proper size or dimensions to closely and snugly embrace the free ends of the frame-sections, and which carry a binding-screw, 6, so that the sections are very firmly held together, while at the same time they can be adjusted laterally to accommodate the machine to different widths of rows.

The handles 7 of the machine are provided with headed ferrules 8, which are loosely journaled on the short axles 3, and connected together by a transverse brace or tie-bar, 9, to prevent the handles from spreading apart, the heads of the ferrules having binding-screws to hold the handle rigidly to the axles.

10 designates brace arms or rods, which are pivotally connected to the short axles and bear against the enlarged heads of the ferrules, one of these arms or rods being provided for each of the axles and bearing-wheels. A vertically-disposed brace arm or rod, 11, is adjustably connected to each of the handles 7, and the free ends of the rods or arms 10 and 11 are rigidly connected to the cultivator-carrier 12, that corresponds to the slotted beam D, heretofore described, by a single through-bolt. This carrier 12 is provided with a curved or bow-shaped portion that is slotted longitudinally, as shown in Fig. 6, and the ends of the curved portion are brought and connected together and provided with the enlargement or lug 13, that is perforated, and by means of which and a pin or bolt that passes into the rod 10 the carrier 12 is adjustable at any desired angle. In this device the carriers are adjustable independently of each other, either vertically by means of the rod 11 or at an angle or incline, as above described, and they trail or are drawn along by the short axles 3 of the frame.

I have shown a single-wheel cultivator having a single handle-bar, 14, which is bifurcated at its lower end to provide two arms, which lie on opposite sides of the carrying-wheel, to support the axle or shaft thereof, and to this shaft or axle is pivotally connected one end of a rod, 15. The other end of this drag-bar is bolted to the shank of one of the cultivator-blades 16, to which is secured by means of bolts two cross-bars, 17 and 18, which carry a shovel or cultivator-blade, and have the arms or branches 19 of a vertically-disposed brace-rod, 20, secured thereto by bolts to support and strengthen the same, the free end of this brace-rod being vertically adjustable on the handle-bar, which is provided with a cross-bar at one end and suitably braced, as clearly shown.

The single cultivator-blades shown herein can be rigidly disconnected from the bar 15 and brace-arm 20, and a series of harrow-teeth, arranged on two frames that are held at an angle to or parallel with each other, can be bolted to the bar and brace to harrow the ground, or any other suitable implement can be substituted therefor.

In Fig. 8 of the drawings I have shown one form of garden tool or implement that can be attached to the slotted carrier hereinbefore shown and described. This tool or implement has its frame made in one piece and provided with two parallel side arms and an intermediate arm which is shorter than the side arms, and to the free ends of these arms are bolted the shanks of the cultivator-blades, which are readily detached and adjustable, if desired, the frame having a perforated prong through which are passed the bolts for connecting the device to the slotted carrier or beam.

Fig. 9 shows a frame having two parallel connected arms and the perforated prongs formed with each other, and the arms carrying the cultivator-blades, which in the form shown herein are preferably five in number, either rigidly, detachably, or adjustably secured in place.

Fig. 10 shows a cultivator-frame comprising two side bars that carry the cultivator-blades, each having three in number in the present instance, and which are bolted at their front ends to a single plate, and this plate carries a short arm provided with a single tooth. The plate is fitted to bear on the under face of the slotted carrier either in the form shown in Figs. 1 or 6, and the bars that carry the blades are adjustable laterally of and at an angle to each other, the dotted lines in Fig. 10 illustrating the slotted beam or carrier.

I have shown two series of harrow-teeth that are carried by independent bars in Fig. 11, and these bars are bolted, so as to be readily and quickly detachable and adjustable independently of each other, to either form of slotted carrier shown herein.

In my cultivators I employ a blade, 21, of peculiar form, and which I have found to be very advantageous and thoroughly practical through a long series of experiments. Fig. 13 shows another form of scalping-hoe to be attached to the slotted beam or carrier. This blade is provided with a narrow arm, 22, which is tapered and rounded or curved on its edges to adapt it to be bolted to the shank that secures it to the slotted carrier, and the blade has lateral wings 23 projecting from about its middle, so as to give greater width thereto, the upper edges of the wings being curved and arranged at an acute angle, while the side edges thereof are inclined toward each other until they meet at a point, 24, which readily and easily penetrates the ground.

If preferred, the carrier 12 may have its shank or prong attached to one end of a handle to adapt it for use by hand, similar to a hoe, and the various form of cultivating or harrowing implements may be bolted thereto.

The seed-drill can be easily and readily applied or adjusted for use, and detached so that the device can be used for cultivating, harrowing, or the like, the slotted carrier or beam being reversed, so as to adapt the various forms of implements or tools to be bolted thereto. A small breaking-plow or a "scalping-hoe" of any preferred or common form can also be adjusted and secured on the slotted carrier. The seed-drill is provided with the spring-brake and the means for actuating it, and the handles have the shoulder-strap connected thereto by the snap-hooks, as described in my former patent, hereinbefore referred to; but as these features do not form a part of the present invention I have not deemed it necessary to describe them.

It will be observed from the foregoing description that I provide a machine which is very simple, light, and strong in its construction, and comparatively cheap and inexpensive of manufacture. The machine is especially adapted to the wants of those engaged in the nursery trade or light gardening, and it is capable of doing all the work that has been heretofore performed with hand implements.

The machine is capable of use in plowing, harrowing, to prepare the land, sow or drill the seed, and cultivate the growing crops, thus adapting it for use at all seasons of the year.

Having thus fully described my invention, what I claim as new, and desire to secure by Letters Patent, is—

1. The combination, with the braces or rods, of the horizontally-disposed arms D, supported and adjustable at varying angles to the rods, and the carrier or beam supported in the arms, substantially as described.

2. The combination, with the rods, of the horizontally-disposed arms supported by and adjustable at varying angles to the rods and provided with the transverse openings and binding-screws, and a carrier or beam having the extended lugs at its ends fitted in the openings of the arms and clamped therein by the binding-screws, substantially as described.

3. The combination, with the rods or braces, of the arms D, supported thereby, the carrier or beam having the curved seats $c$ on one of its faces, the tube or hoe of the seed-drill fitted on and bearing on the seats $c$, and means for detachably clamping the tube and carrier together, substantially as described.

4. The combination of the carrier or beam having the angular lugs, the arms having the openings for the lugs and carrying the binding-screws, the brace rods or arms E and F, and the longitudinal bolt or rod $e$, having the brace rods or arms fitted thereon and supported in the arms to which the carrier is connected, substantially as described.

5. The combination of the slotted carrier, a frame, L, connected thereto, a marker-arm carried by the frame, a marker loosely fitted on the arm, and a retaining-yoke for adjusting the marker to any desired point on the arm, substantially as described.

6. The combination of the slotted carrier, a frame, L, connected thereto, a marker-arm carried by the frame, a marker adjustable longitudinally of the arm, and a yoke having the bands or rings fitted on the arm and provided with a binding-screw for rigidly clamping the yoke on the arm and retaining the marker against longitudinal movement thereon, substantially as described.

7. The combination of a carrier or beam, the detachable frame L, having the angular lugs $l$, bearing against the carrier, and through-bolts passing through the lugs and carrier for detachably securing the frame to the carrier, the arms $k'$, supported by the frame, a roller journaled in the arms, and a scraper-blade secured to the arms and bearing on the periphery of the roller, substantially as described.

8. The combination of the hoe or drill-tube, the standards having the slotted ends, a sectional seed-drum, and a transverse shaft or rod passing through the drum for supporting the same and retaining the sections thereof at their adjusted positions, said shaft carrying washers and having a threaded end provided with a binding-screw, substantially as described.

9. The combination of a slotted carrier, a frame, L, having the angular perforated lugs, the bolts for adjustably securing the frame to the carrier, the arms having the blade and covering-roller, and the marker carried by the adjustable frame, substantially as described.

10. The combination of the slotted carrier having the angular lugs, the arms D, having the sockets and binding-screws, and the angular perforated enlargements or lugs at one end, the brace-rod E, connected to the arm, and a bolt or pin passing through one of the apertures of the enlargement and the brace-arm E for holding the carrier at an angle or other adjustment, substantially as described.

11. The combination of the laterally-adjustable frames carrying the short axles, the common sleeve for connecting the frames, the carrying-wheels journaled on the axles, the drag-bars pivoted to the axles, the independent carriers pivotally and adjustably connected to the drag-bars, and the brace-arms, substantially as described.

12. The combination of the handle or handles, a carrying-wheel, a drag bar or arm connected to the axle or shaft, a slotted carrier having the angular perforated enlargement, a depending brace-arm connected to the carrier, and a pin or bolt passing through one of the apertures of the enlargement and into the drag bar or arm, substantially as described.

In testimony that I claim the foregoing as my own I have hereto affixed my signature in presence of two witnesses.

CHRISTOPHER C. HUNTER.

Witnesses:
L. B. HAY,
S. D. HOUSTON, Sr.